April 29, 1930.　　　　J. E. CLEMENT　　　　1,756,851
WOODWORKER'S TOOL
Filed May 31, 1928　　　2 Sheets-Sheet 1
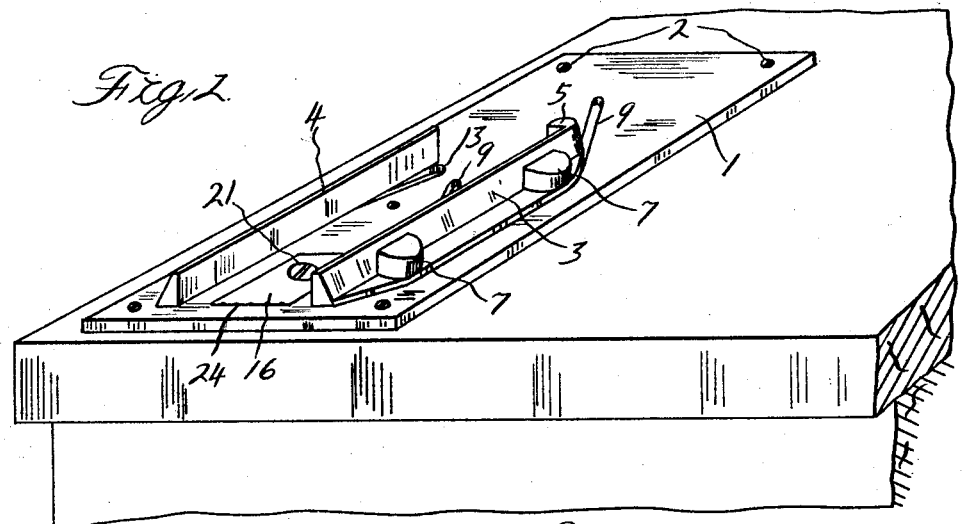
Fig.1.
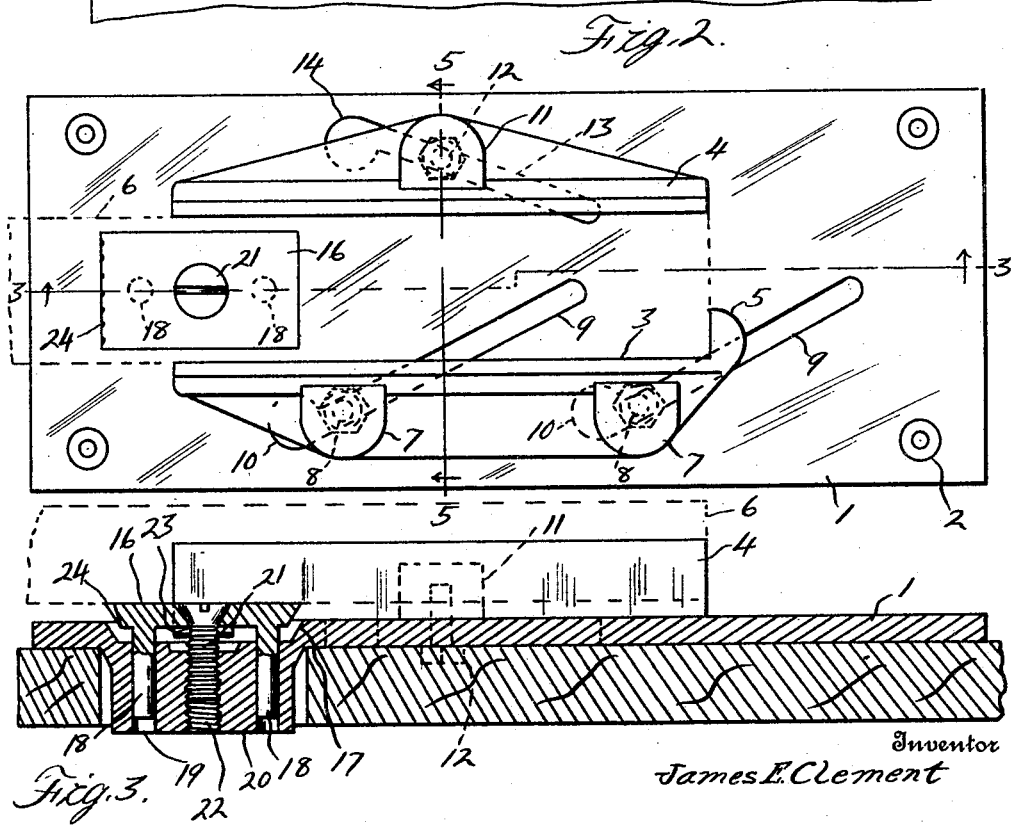
Fig.2.
Fig.3.
Inventor
James E. Clement
By Swan, Frye & Murray
Attorneys April 29, 1930.　　　　　J. E. CLEMENT　　　　　1,756,851
WOODWORKER'S TOOL
Filed May 31, 1928　　　　2 Sheets-Sheet 2

Inventor
James E. Clement
By Swan, Frye & Murray
Attorneys

Patented Apr. 29, 1930

1,756,851

UNITED STATES PATENT OFFICE

JAMES E. CLEMENT, OF NEW BALTIMORE, MICHIGAN

WOODWORKER'S TOOL

Application filed May 31, 1928. Serial No. 281,809.

This invention relates to woodworkers' tools, and particularly to devices for holding work in a desired position, while the same is being planed or otherwise worked upon.

An object of the invention is to provide a work holder comprising a pair of clamping jaws which are freely adjustable to accommodate themselves to differently shaped pieces of work, and which are particularly adapted for engaging and firmly holding pieces of a more or less wedge shape.

Another object is to provide a work holder comprising a pair of coacting jaws, one of which is adjustable pivotally to and from the other and is further bodily adjustable in a direction acutely angular to the work-engaging face of the other.

A further object is to provide a work holder comprising a pair of coacting clamping jaws, which are freely bodily adjustable in acutely convergent directions, one of said members being restrained from pivotal movement, and the other being freely pivotally adjustable to and from the other, whereby said jaws are quickly engaged with and adapted to differently shaped pieces of work.

A still further object is to adapt a stop member or work abutment, by a suitable adjustment means to project more or less beyond the surface of a work table, so that its degree of projection may be suited to the thickness of the work, avoiding the possibility of the chisel of a plane striking said abutment.

It is also an object of the invention to form a work table with a depression for receiving a stop member when the latter is out of use, and to adapt said member to be readily moved out of said depression to a working position.

These and various other objects the invention attains by the construction hereinafter described and illustrated in the accompanying drawings wherein:

Fig. 1 is a perspective view of a work table, showing the herein-described work-holder applied thereto.

Fig. 2 is a plan view of the same, showing the jaws thereof positioned for engaging a substantially rectangular piece of work.

Fig. 3 is a longitudinal, vertical, sectional view of the same taken upon the line 3—3 of Fig. 2.

Figure 4:
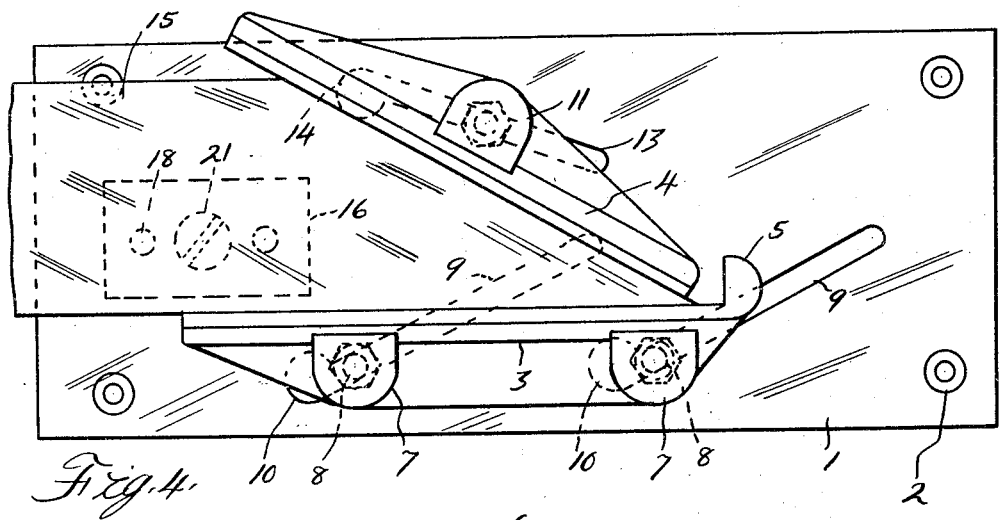
Fig. 4 is a plan view of said work holder, showing said jaws engaging acutely convergent faces of a piece of work.
Figure 5:
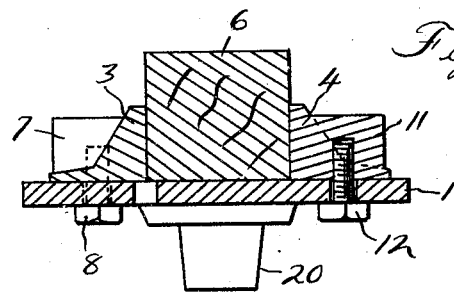
Fig. 5 is a cross-sectional view taken upon the line 5—5 of Fig. 2.

In these views, the reference character 1 designates a metal plate adapted to be secured by screws 2, or other suitable means to a work table. Said plate carries a pair of spaced, elongated work-clamping jaws 3 and 4 having opposed, substantially vertical, clamping faces. The jaw 3 is hooked at one extremity toward the jaw 4, as indicated at 5, to form an abutment for an end of a piece of work 6, held between said jaws. A pair of bosses 7, formed upon the top surface of the jaw 3, and spaced lengthwise of said jaw, are bored and tapped to receive a pair of screws 8, having headed downwardly projecting ends. The shanks of said screws respectively pass through a pair of parallel elongated slots 9, acutely divergent to the clamping face of the jaw 3, as is best seen in Fig. 2, the heads of said screws engaging beneath said plate. Thus the screws 8 are adapted to guide the jaw 3 in a sliding travel lengthwise of the slots 9, while the heads of said screws normally retain said jaw superposed on the plate 1. Preferably the slots 9 are sufficiently enlarged at corresponding ends 10, to permit upward withdrawal of the screw heads when registered with said enlargements. Thus, if desired, the jaw 3 with its guiding screws may be readily removed from the plate 1.

The jaw 4 is formed substantially midway of its length with a boss 11 upon its top surface, into which boss is tapped from beneath a headed guide screw 12, the shank of which passes through an elongated slot 13 in the plate 1, acutely angular to the length of the plate 1 and convergent toward the slots 9. The head of the screw 12, engaging beneath the plate 1, normally holds the jaw 4 to said plate, while permitting said jaw to move bodily lengthwise of the slot 13 and to also pivot about the axis of said screw. To permit removal of the jaw 4 with its guide screw from the plate 1, one extremity of the slot 13 is sufficiently enlarged as indicated at 14, to accommodate an upward travel of the head of said screw.

In the use of the invention as so far described, the piece of work to be held is inserted between the jaws 3 and 4, with one of its extremities abutting the hook 5. The jaws are now moved bodily toward each other, along the converging lines established by the slots 9 and 13, and any stress applied to the work in the direction of convergency of said slots tends to draw said jaws still more firmly against the work. Thus so long as the working stress acts in the direction of convergency of said slots, the work will remain securely clamped by said jaws. Because of its freedom of pivotal movement about its guide screw 12, the jaw 4 will adapt itself to any angularity existing between the faces of the work engaged by the jaws. Thus in Fig. 4, it is seen how the jaw 4 adjusts itself at an inclination to the jaw 3, to engage a wedge-shaped piece of work 15.

It is preferred to additionally employ the plate 1 as a mounting for a stop member 16, which in the illustrated embodiment of the invention has the nature of a metal plate. When not in use, said plate may be received by a depression 17 in the top face of the plate 1 so as to lie flush with said face. A pair of guide pins 18 projecting integrally downwardly from the member 16, are vertically slideable in sockets 19 in an enlargement 20 upon the plate 1 formed integrally with its under face. An adjusting screw 21 having its head centrally rotatively countersunk in the member 16, is tapped into a suitable bore 22 in the enlargement 20, a pin 23 being carried by said screw beneath the member 16, (see Fig. 3) so as to adapt the member 16 to be raised through upward adjustment of said screw. One edge of the stop member 16 is preferably serrated as indicated at 24, to adapt it to more securely engage a piece of work abutting said member.

Figure 7:
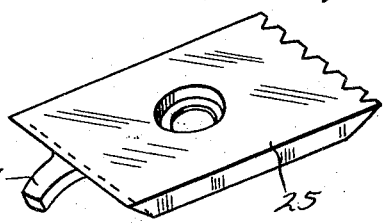
Fig. 7 is a perspective view of the stop member illustrated in Fig. 6.
Figure 6:
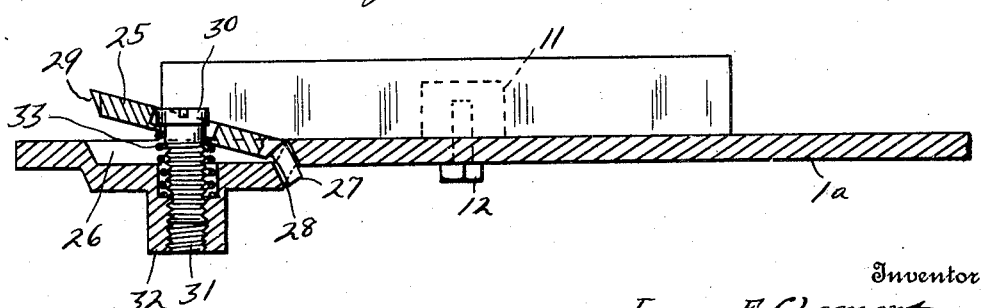
Fig. 6 is a view similar to Fig. 3, but disclosing an alternative form of adjustable stop member.

In the alternative construction shown in Figs. 6 and 7, there is employed a metal stop plate 25 in place of the first described member 16. The member 25 is adapted when not in use to seat within a depression 26 in the top of the mounting plate 1ª and one end of said member is formed with an integral tongue 27, engaging in a slot 28, passing through said plate at one end of the depression 26. The engagement of said tongue in said slot provides for a sufficient pivotal movement of the plate 25 to permit its serrated end 29 to be raised from the described stored position to the position of use, illustrated in Fig. 6. An adjusting screw 30 passes through a central opening in the member 25 and is tapped into a bore 31 in an enlargement 32 on the bottom of the plate 1ª for adjusting said member downwardly. A coiled spring 33, is compressed between the member 25 and the enlargement 32 to urge said plate to its raised position, so far as is permitted by the screw 30.

The described work holder is adapted for numerous woodworking uses, and is particularly suited for holding a piece of wood or of other material rigidly in place, while being planed or subjected to some other operation.

The automatic adaptability of the jaws of the described holder to the dimensions and shape of any piece of work engaged by the said jaws, accomplishes an important saving of time and adapts the described device to various purposes for which ordinary work clamps are quite unsuited.

The vertical adjustability of the stop member 16, or 25, is desirable to permit said member to be adjusted according to the thickness of an engaged piece of work, so that while said work is being planed, the forward stress of the plane will be firmly resisted by said stop member, while the latter will be sufficiently below the surface of the work, to prevent any injurious engagement of the chisel of the plane with said stop member. Also, the described adjustability of the stop member 16 or 25 permits the latter to be disposed completely out of the way when not in use.

While it will be apparent that the illustrated embodiments of my invention herein disclosed are well calculated to adequately fulfill the objects and advantages primarily stated, it is to be understood that the invention is susceptible of variation, modification and change within the spirit and scope of the subjoined claims.

What I claim is:

1. A work holder comprising a plate formed with a pair of spaced, parallel, elongated slots, and with a third slot occupying an acutely angular relation to the first mentioned slots, a pair of co-acting jaw members mounted upon said plate, guide members upon one of said jaw members engaging in said parallel slots to permit movement of the jaw member with its contact face in parallel planes, and a guide member carried by the other jaw member, engaging in said third slot and permitting movement of such jaw member with its contact face either parallel to or angularly disposed relatively to the contact face of the first-mentioned jaw member.

2. A work holder comprising a substantially rectangular plate, an elongated jaw member mounted on said plate and movable longitudinally and laterally of said plate while restrained to maintain its contact face substantially parallel with the sides of the plate, and a second jaw member mounted on said plate and movable both pivotally and angularly relatively to the first-mentioned jaw member.

3. A work holder comprising a substantially rectangular plate having a pair of parallel slots therein angularly disposed relatively to the sides of the plate, an elongated jaw member mounted in the parallel slots on said plate and movable longitudinally and laterally of said plate while restrained to maintain its contact face substantially parallel with the sides of the plate, and a second jaw member mounted on said plate and movable both pivotally and angularly relatively to the first-mentioned jaw member.

4. A work holder comprising a substantially rectangular plate having a pair of parallel slots therein angularly disposed relatively to the sides of the plate and a third slot arranged at an acute angle to the parallel slots, an elongated jaw member mounted in the parallel slots on said plate and movable longitudinally and laterally of said plate while restrained to maintain its contact face substantially parallel with the sides of the plate, and a second jaw member mounted in the third slot on said plate and movable both pivotally and angularly relatively to the first-mentioned jaw member.

In testimony whereof I sign this specification.

JAMES E. CLEMENT.